United States Patent
Lin (10) Patent No.: US 9,983,471 B1
(45) Date of Patent: May 29, 2018

(54) LASER LIGHT SOURCE

(71) Applicant: DELTA ELECTRONICS, INC., Taoyuan (TW)

(72) Inventor: Hung-Ying Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days. days.

(21) Appl. No.: 15/709,464

(22) Filed: Sep. 19, 2017

(30) Foreign Application Priority Data

May 2, 2017 (CN) .......................... 2017 1 0301212

(51) Int. Cl.
| | |
|---|---|
| G03B 21/14 | (2006.01) |
| H04N 9/31 | (2006.01) |
| G03B 21/20 | (2006.01) |
| G02B 26/00 | (2006.01) |

(52) U.S. Cl.
CPC ......... G03B 21/208 (2013.01); G02B 26/008 (2013.01); G03B 21/147 (2013.01); G03B 21/204 (2013.01); G03B 21/2066 (2013.01); H04N 9/3102 (2013.01); H04N 9/3111 (2013.01); H04N 9/3114 (2013.01)

(58) Field of Classification Search
CPC ...... H04N 9/3114; H04N 9/3108; H04N 9/31; G03B 21/14; G03B 21/005; G03B 21/006; G03B 21/008
See application file for complete search history.

(56) References Cited

U.S. PATENT DOCUMENTS

| | | | | |
|---|---|---|---|---|
| 8,882,279 B2* | 11/2014 | Huang | ............... | G03B 21/2013 348/771 |
| 9,046,750 B2* | 6/2015 | Matsubara | ........... | G03B 21/204 |
| 2012/0127435 A1* | 5/2012 | Kitano | ................. | G03B 21/204 353/20 |
| 2014/0211169 A1* | 7/2014 | Kitano | ................. | G03B 21/204 353/31 |

FOREIGN PATENT DOCUMENTS

| | | |
|---|---|---|
| CN | 102854623 A | 1/2013 |
| TW | I486699 | 6/2015 |
| TW | I503617 B | 10/2015 |

\* cited by examiner

*Primary Examiner* — William C Dowling
(74) *Attorney, Agent, or Firm* — CKC & Partners Co., Ltd.

(57) ABSTRACT

A laser light source includes a laser light source module, a light converging module, first and second lens sets, a color wheel, and a light tunnel. The laser light source module emits a first light. When passing the light converging module, the first light converges in a second direction perpendicular to the travel direction of the first light and does not converge in a third direction perpendicular to the second direction and the travel direction. The first light becomes a parallel beam after passing the light converging module. Then, the first light enters the first lens set. The color wheel receives the first light passing the first lens set, partially transforms the first light into a second light, and partially reflects the first light. Then, the first and second light pass the first and second lens sets. Then, the light tunnel collects the first and second light.

10 Claims, 5 Drawing Sheets

LASER LIGHT SOURCE

RELATED APPLICATIONS

This application claims priority to China Application Serial Number 201710301212.7, filed May 2, 2017, which is herein incorporated by reference.

BACKGROUND

Technical Field

The present disclosure relates to a laser light source, and more particularly, to a laser light source for a projector.

Description of Related Art

With the development of the laser light source, the size of the laser light source is getting smaller and smaller, and the power and the brightness of the laser light source are getting better and better. Therefore, using laser as the light source of the projector is getting more common. However, the laser light source has some congenital shortcomings in the application, that is, the shape of the beam is an oval. In addition, because of the manufacturing process, the divergence angle, the tile angle, and the focal length of each laser light source are different from those of the other laser light source. Therefore, the image quality of the projectors in which the laser light sources are used will be affected by the beam shape and the focal length.

To further improve the laser light source for the projector, persons in the industry have made every endeavor to discover new solutions. The application and improvement of the laser light source for the projector have become one of the most important research topics.

SUMMARY

This disclosure provides a laser light source for a projector to enhance the light collection efficiency of the collector and reduce the volume of the laser light source.

In one aspect of the disclosure, a laser light source for a projector is provided. The laser light source includes a laser light source module, a light converging module, a first lens set, a color wheel, a second lens set, and a light tunnel. The laser light source module emits a first color light. The first color light has a travel direction when the first color light passes the light converging module. The travel direction is a first direction. The light converging module converges the first color light along a second direction perpendicular to the first direction and does not converge the first color light along a third direction perpendicular to the first direction and the second direction. The light converging module makes the first color light become a parallel beam after the first color light passes the light converging module. The first lens set has a first half portion and a second half portion. The first half portion receives the first color light emitted by the light converging module and makes the first color light become a converging beam after the first color light passes the first half portion. The color wheel receives the first color light emitted by the first half portion, transforms a part of the first color light to a second color light, and reflect a part of the first color light. The incident angle the first color light incident on the color wheel is less than 90°. The second color light and the reflected first color light enter the second half portion. The second color light and the reflected first color light become parallel beams after the second color light and the reflected first color light pass the second half portion. The second lens set receives the first color light and the second color light emitted by the second half portion and makes the first color light and the second color light become converging beams after the first color light and the second color light pass the second lens set. The light tunnel collects the first color light and the second color light emitted by the second lens set.

In one or more embodiments, the laser light source further includes a converging lens and a diverging lens. The converging lens receives the first color light emitted by the laser light source module and makes the first color light become a converging beam after the first color light passes the converging lens. The diverging lens receives the first color light emitted by the converging lens and makes the first color light become a parallel beam after the first color light passes the diverging lens.

In one or more embodiments, the light converging module includes a first lenticular lens and a second lenticular lens. The first lenticular lens receives the first color light emitted by the laser light source module and makes the first color light become a converging beam after the first color light passes the first lenticular lens. The second lenticular lens receives the first color light emitted by the first lenticular lens and makes the first color light become a parallel beam after the first color light passes the second lenticular lens.

In one or more embodiments, beam space distributions of the first color light before the first color light is incident on the color wheel and after the first color light is reflected by the color wheel does not overlap with each other.

In one or more embodiments, the first color light and the second color light do not pass any other optical component after the first color light and the second color light exit the second half portion and before the first color light and the second color light enter the second lens set.

In one or more embodiments, the laser light source further includes a reflector. The reflector reflexes the first color light after the first color light passes the light converging module and make the first color light enter the first lens set.

In one or more embodiments, the first color light passes the reflector once in an overall optical path of the laser light source.

In one or more embodiments, a beam space distribution of the first color light between the light converging module and the reflector partially overlaps a beam space distribution of the first color light between the first lens set and the second lens set.

In one or more embodiments, the color wheel includes a body, a reflective layer, and a fluorescent layer. The reflective layer is disposed on the body. The fluorescent layer is disposed on the reflective layer.

In one or more embodiments, the laser light source further includes a diffuser. The diffuser receives the first color light emitted by the light converging module and makes an energy distribution of the first color light become uniform after the first color light passes the diffuser.

Because the light converging module converges the first color light along the second direction perpendicular to the travel direction of the first color light and does not converge the first color light along the third direction perpendicular to the travel direction and the second direction, the projections of the first color light and the second color light on the light receiving opening will be located in the light receiving opening. Therefore, because all the projections are located in the light receiving opening, the energy loss can be avoided. In other words, because the light converging module converges the first color light, the light collection efficiency of the collector is effectively enhanced.

In addition, because the first lens set converges the beam and thus change the travel direction of the beam, and the incident angle will be equal to the reflecting angle, after the first color light enters the first half portion of the first lens set, the color wheel transforms a part of the first color light to the second color light and reflects a part of the first color light, and the second color light and the reflected first color light then pass the second half portion of the first lens set and become the parallel beam. Therefore, after the first color light passes the diffuser, the first color light only needs to pass the reflector, the first lens sec, the color wheel, and the second lens set to reach the light tunnel, such that the number of the optical components in the optical path system is significantly reduced and thus the volume of the laser light source is effectively reduced.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
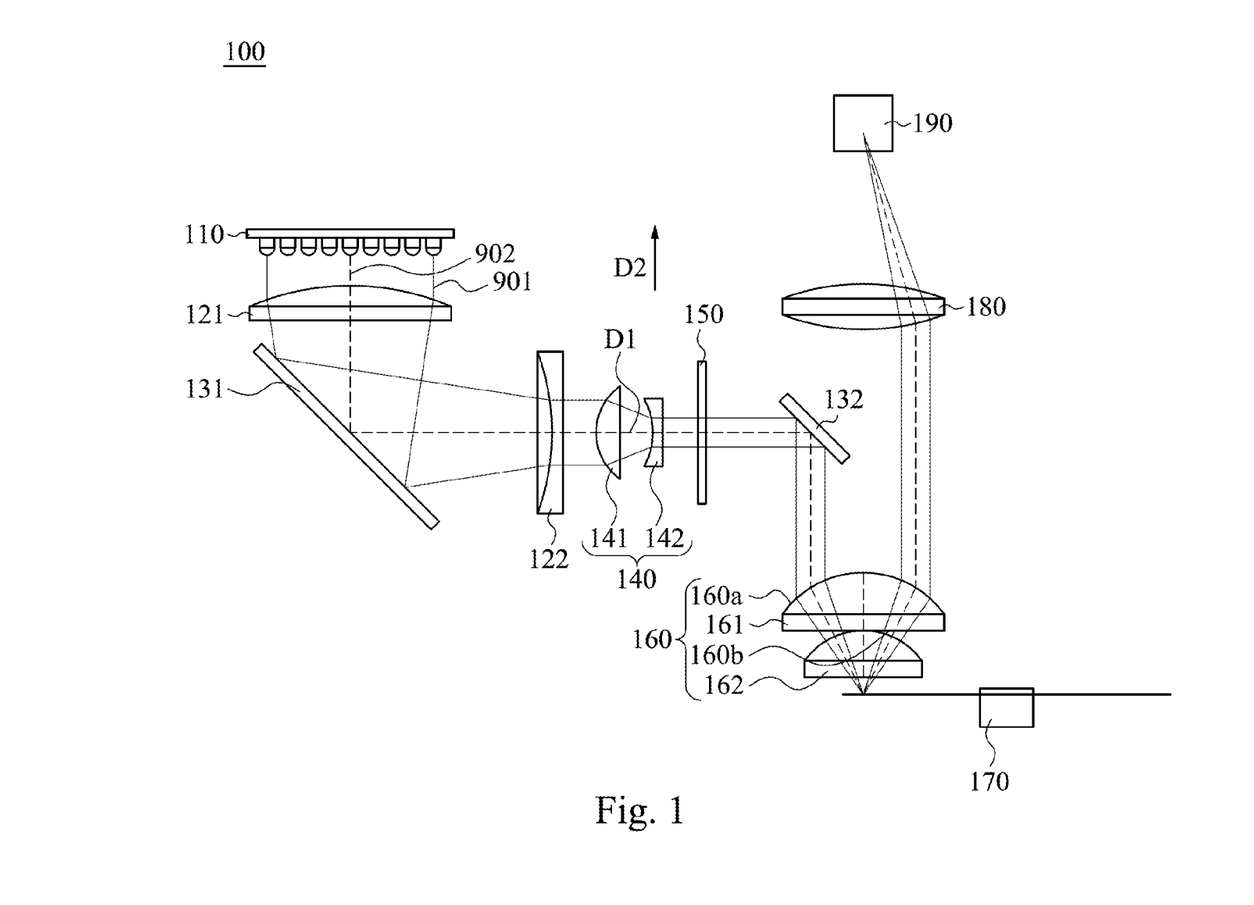
FIG. 1 is a schematic side view of a laser light source for a projector and the associated light path according to one embodiment of this disclosure.

FIG. 1 is a schematic side view of a laser light source 100 for a projector and the associated light path according to one embodiment of this disclosure. A laser light source 100 is provided. As shown in FIG. 1, the laser light source 100 includes a laser light source module 110, a converging lens 121, a reflector 131, a diverging lens 122, a light converging module 140, a diffuser 150, a reflector 132, a first lens set 160, a color wheel 170, a second lens set 180, and a light tunnel 190.

The laser light source module 110 emits a first color light 901, and the first color light 901 has an optical axis 902. The converging lens 121 receives the first color light 901 emitted by the laser light source module 110 and makes the first color light 901 become a converging beam after the first color light 901 passes the converging lens 121. Then, the first color light 901, which becomes the converging beam, will be reflected by the reflector 131, and the travel direction of the first color light 901 will be changed. The diverging lens 122 receives the first color light 901 reflected by the reflector 131 and emitted by the converging lens 121 and makes the first color light 901 become a parallel beam after the first color light 901 passes the diverging lens 122.

Then, the first color light 901 passes the light converging module 140. The first color light 901 has a travel direction when the first color light 901 passes the light converging module 140. The travel direction is first direction D1. The light converging module 140 converges the first color light 901 along second direction D2 perpendicular to first direction D1 and does not converge the first color light 901 along third direction D3 perpendicular to first direction D1 and second direction D2 (see FIG. 3 and FIG. 4). The light converging module 140 makes the first color light 901 become a parallel beam after the first color light 901 passes the light converging module 140.

The diffuser 150 receives the first color light 901 emitted by the light converging module 140 and makes the energy distribution of the first color light 901 become uniform after the first color light 901 passes the diffuser 150. Then, after the first color light 901 passes the diffuser 150 or the light converging module 140, the first color light 901 will be reflected by the reflector 132, and the travel direction of the first color light 901 will be changed, such that the first color light 901 enters the first lens set 160.

The first lens set 160 has a first half portion 160a and a second half portion 160b. The first half portion 160a receives the first color light 901 reflected by the reflector 132 and emitted by the light converging module 140 and makes the first color light 901 become a converging beam after the first color light 901 passes the first half portion 160a. The color wheel 170 receives the first color light 901 emitted by the first half portion 160a, transforms a part of the first color light 901 to a second color light, and reflects a part of the first color light 901. The incident angle the first color light 901 incident on the color wheel 170 is less than 90°. The second color light and the reflected first color light 901 enter the second half portion 160b. The second color light and the reflected first color light 901 become parallel beams after the second color light and the reflected first color light 901 pass the second half portion 160b. It is noted that the optical path of the second color light is approximated the same with the first color light 901 reflected by the color wheel 170, such that the optical path of the second color light is not shown in FIG. 1.

The second lens set 180 receives the first color light 901 and the second color light emitted by the second half portion 160b and makes the first color light 901 and the second color light become converging beams after the first color light 901 and the second color light pass the second lens set 180. Finally, the light tunnel 190 collects the first color light 901 and the second color light emitted by the second lens set 180.

Because the first lens set 160 converges the beam and thus change the travel direction of the beam, and the incident angle will be equal to the reflecting angle, after the first color light 901 enters the first half portion 160a of the first lens set 160, the color wheel 170 transforms a part of the first color light 901 to the second color light and reflects a part of the first color light 901, and the second color light and the reflected first color light 901 then pass the second half portion 160b of the first lens set 160 and become the parallel beam. Therefore, after the first color light 901 passes the diffuser 150, the first color light 901 only needs to pass the reflector 132, the first lens set 160, the color wheel 170, and the second lens set 180 to reach the light tunnel 190, such that the number of the optical components in the optical path system is significantly reduced and thus the volume of the laser light source 100 is effectively reduced.

Figure 2:
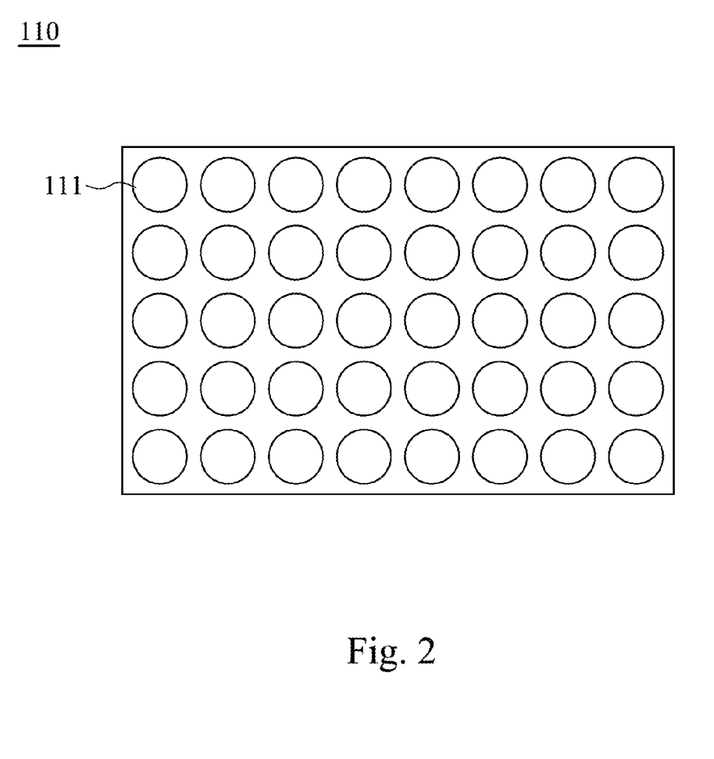
FIG. 2 is a schematic front view of a laser light source module according to one embodiment of this disclosure.

FIG. 2 is a schematic front view of the laser light source module 110 according to one embodiment of this disclosure. As shown in FIG. 2, the laser light source module 110 includes a plurality of laser light sources 111, and the light emitted by the laser light sources 111 forms the first color light 901. In this embodiment, the laser light source module 110 includes forty laser light sources 111.

Figure 3:
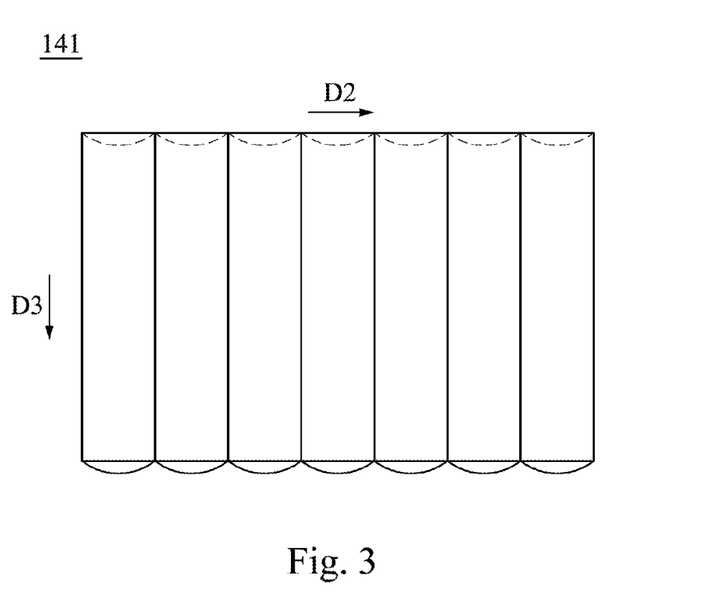
FIG. 3 is a schematic front view of a first lenticular lens according to one embodiment of this disclosure.
Figure 4:
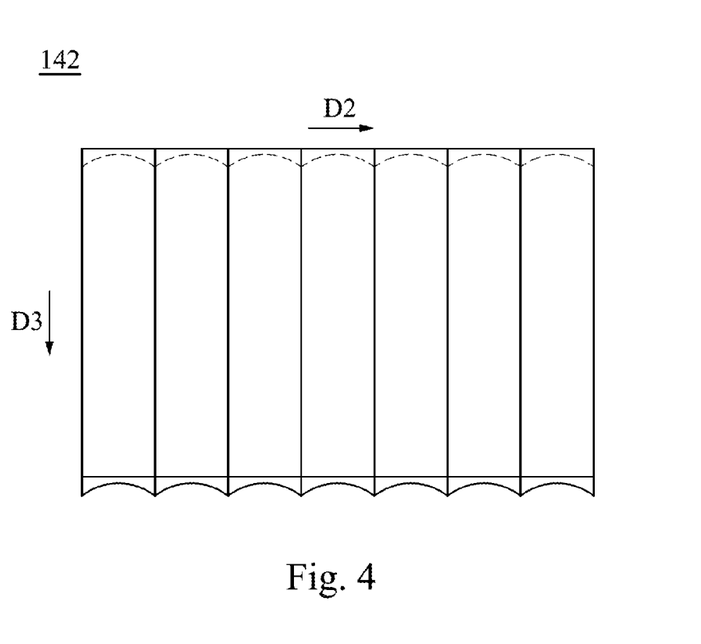
FIG. 4 is a schematic front view of a second lenticular lens according to one embodiment of this disclosure.

FIG. 3 is a schematic front view of the first lenticular lens 141 according to one embodiment of this disclosure. FIG. 4 is a schematic front view of the second lenticular lens 142 according to one embodiment of this disclosure. As shown in FIG. 1, FIG. 3, and FIG. 4, the light converging module 140 includes a first lenticular lens 141 and a second lenticular lens 142. The first lenticular lens 141 receives the first color light 901 emitted by the laser light source module 110 and makes the first color light 901 become a converging beam, which converges along first direction D1 and does not converge along direction D2, after the first color light 901 passes the first lenticular lens 141. The second lenticular lens 142 receives the first color light 901 emitted by the first lenticular lens 141 and makes the first color light 901 become a parallel beam after the first color light 901 passes the second lenticular lens 142.

It is noted that, in other embodiments, the light converging module 140 may not include the first lenticular lens 141 and the second lenticular lens 142 and include other optical components. The key point is that, after the first color light 901 passes the light converging module 140, the first color light 901 is maintained as a parallel beam, the first color light 901 converges along second direction D2 perpendicular to the travel direction of the first color light 901 and does not converge along third direction D3 perpendicular to the travel direction of the first color light 901 and second direction D2.

As shown in FIG. 1 and FIG. 2, because the first color light 901 is formed by the light similar to point light and emitted by the laser light sources 111, the energy density of some parts of the first color light 901 may be too high when the color wheel 170 receives the first color light 901, such that the fluorescent layer on the color wheel 170 may be damaged. In order to avoid the aforementioned problem, the first color light 901 is made to pass the diffuser 150, so the energy distribution of the first color light 901 become uniform. Further, because the energy distribution of the first color light 901 become uniform, the size of the color wheel 170 can be further reduced without damaging the fluorescent layer on the color wheel 170.

It is noted that, in some other embodiments, according to characteristics of the laser light source 100 (for example, the laser energy of the laser light source 111), the laser light source 100 may not include the diffuser 150. The key point is that the fluorescent layer on the color wheel 170 will not be damaged.

In this embodiment, the first lens set 160 includes two converging lens 161 and 162, and the second lens set 180 includes one converging lens. Embodiments of this disclosure are not limited thereto. In some embodiments, the first lens set 160 may include one converging lens or a plurality of (converging) lens, and the second lens set 180 may include a plurality of (converging) lens. The key point is that the first lens set 160 and the second lens set 180 should have excellent imaging ability.

Figure 5:
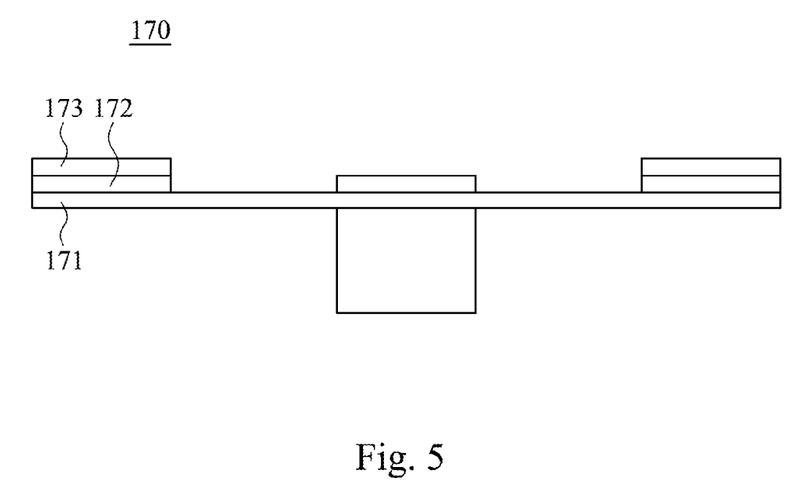
FIG. 5 is a schematic side view of a color wheel according to one embodiment of this disclosure.

FIG. 5 is a schematic side view of the color wheel 170 according to one embodiment of this disclosure. As shown in FIG. 1 and FIG. 5, the color wheel 170 includes a body 171, a reflective layer 172, and a fluorescent layer 173. The reflective layer 172 is disposed on the body 171. The fluorescent layer 173 is disposed on the reflective layer 172. The fluorescent layer 173 transforms a part of the first color light 901 to the second color light. The reflective layer 172 reflects a part of the first color light and the second color light.

Specifically, the first color light 901 is blue light, and the second color light is red light, green light, yellow light, or the combination thereof. Embodiments of this disclosure are not limited thereto. The person having ordinary skill in the art can make proper modifications upon the first color light 901 and the second color light according to actual requirements.

Specifically, beam space distributions of the first color light 901 before the first color light 901 is incident on the color wheel 170 and after the first color light 901 is reflected by the color wheel 170 does not overlap with each other. Therefore, the optical path of the first color light 901 before the first color light 901 is incident on the color wheel 170 are different from the optical path of the first color light 901 after the first color light 901 is reflected by the color wheel 170, and thus the first color light 901 will not pass the reflector 132 twice. In other words, the first color light 901 passes the reflector 132 once in the overall optical path of the laser light source 100. In a traditional optical system, the first color light may pass an optical component similar to the reflector 132 twice, so the optical component, which often is a dichroic mirror, must have both reflecting function and pass through function. However, when the first color light passes the dichroic mirror, the energy of the first color light may be significantly dissipated. In this embodiment, the first color light 901 will not pass the reflector 132 twice, so the energy of the first color light will not be significantly dissipated. Therefore, the first color light 901 and the second color light do not pass any other optical component after the first color light 901 and the second color light exit the second half portion 160b and before the first color light 901 and the second color light enter the second lens set 180.

Figure 6:
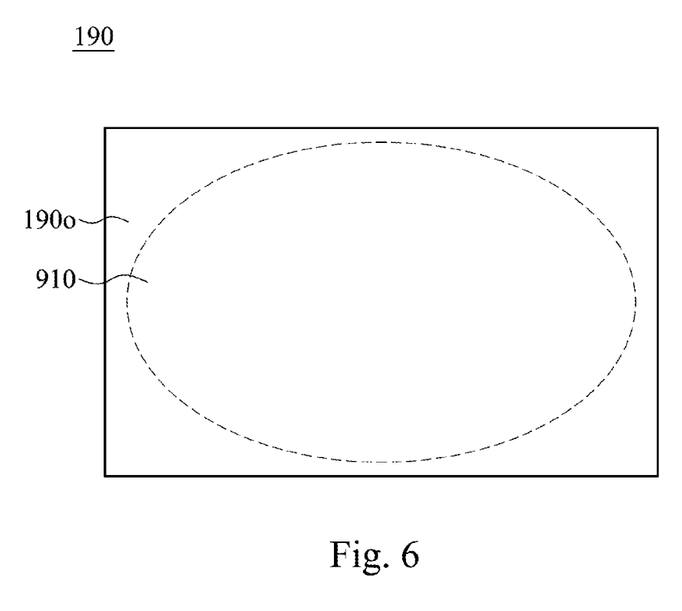
FIG. 6 is a schematic view of a light receiving opening of a light tunnel according to one embodiment of this disclosure.

FIG. 6 is a schematic view of a light receiving opening 190o of a light tunnel 190 according to one embodiment of this disclosure. As shown in FIG. 1 and FIG. 6, the shape of the light receiving opening 190o of the light tunnel 190 is a rectangle. The length of the rectangle is greater than the width of the rectangle, and the projections 910 of the first color light 901 and the second color light on the light receiving opening 190o is an ellipse located in the light receiving opening 190o. It is noted that because the light converging module 140 converges the first color light 901 along second direction D2 perpendicular to the travel direction and does not converge the first color light 901 along third direction D3 perpendicular to the travel direction and second direction D2 (see FIG. 3 and FIG. 4), the projections 910 of the first color light 901 and the second color light on the light receiving opening 190o is an ellipse located in the light receiving opening 190o. If the first color light 901 does not pass the light converging module 140, the shapes of the projections of the first color light 901 and the second color light on the light receiving opening 190o will be similar to a circle, and at least a part of the projections 910 will not be located in the light receiving opening 190o, causing some energy loss of the first color light 901 and the second light. In other words, because the light converging module 140 converges the first color light 901, the light collection efficiency of the light tunnel 190 is effectively enhanced.

Figure 7:
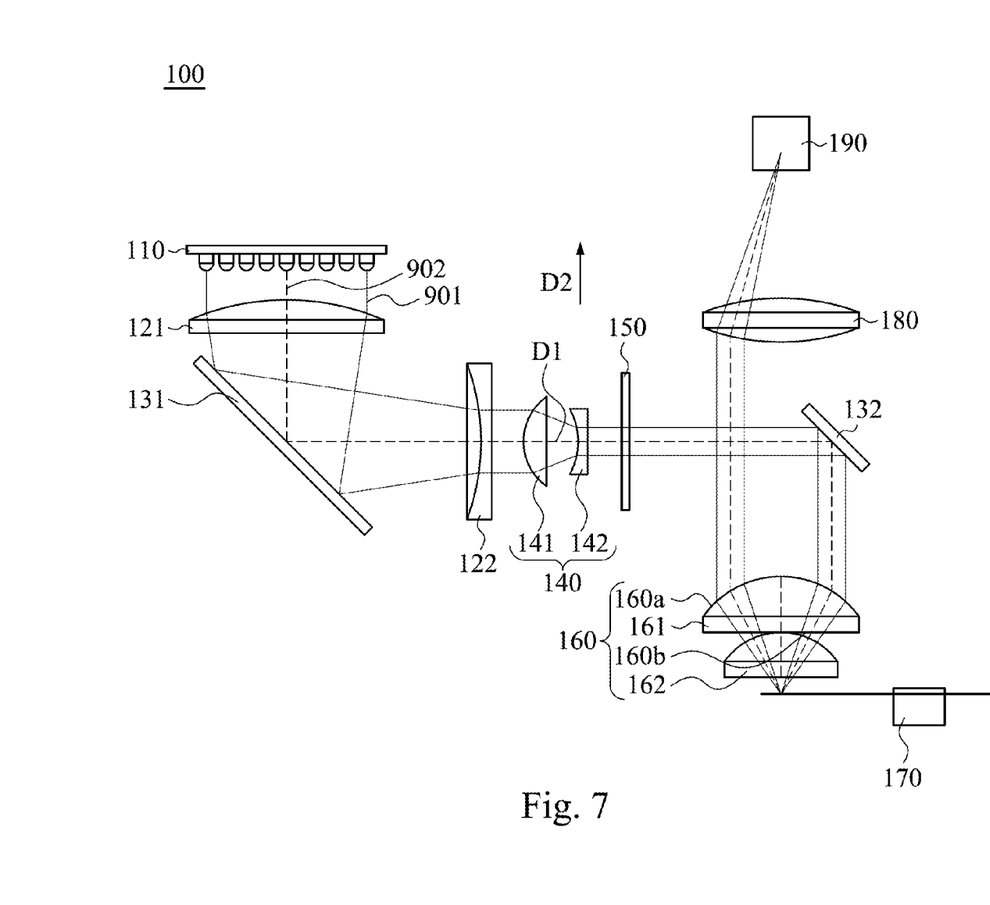
FIG. 7 is a schematic side view of the laser light source for the projector and the associated light path according to another embodiment of this disclosure.

FIG. 7 is a schematic side view of the laser light source 100 for the projector and the associated light path according to another embodiment of this disclosure. The relative positions of the reflector 132 and other optical components can be adjusted according to different situations. For example, as shown in FIG. 7, the reflector 132 may be translated to the left, such that the second half portion 160b receives the first color light 901 reflected by the reflector 132 and makes the first color light 901 becomes a converging beam after the first color light 901 passes the second half portion 160b. The color wheel 170 receives the first color light 901 emitted by the second half portion 160b, transforms a part of the first color light 901 to a second color light, and reflects a part of the first color light 901. The incident angle the first color light 901 incident on the color wheel 170 is less than 90°. The second color light and the reflected first color light 901 enter the first half portion 160a. The second color light and the reflected first color light 901 become parallel beams after the second color light and the reflected first color light 901 pass the first half portion 160a. The other parts of the optical path of the laser light source 100 of this embodiment is similar to the aforementioned embodiment. In addition, the beam space distribution of the first color light 901 between the diffuser 150 (or the light converging module 140) and the reflector 132 partially overlaps the beam space distribution of the first color light 901 between the first lens set 160 and the second lens set 180.

Further, the laser light source 100 does not need to include the reflector 131 and 132, and the relative positions of the reflectors 131 and 132 and other optical components can be adjusted according to different situations.

In addition, if the optical path of the laser light source 100 is not affected, the arrangement order of the optical components in the laser light source 100 may be interchangeably adjusted.

Because the light converging module 140 converges the first color light 901 along second direction D2 perpendicular to the travel direction of the first color light and does not converge the first color light 901 along third direction D3 perpendicular to the travel direction and second direction D2, the projections 910 of the first color light 901 and the second color light on the light receiving opening 190o will be located in the light receiving opening 190o. Therefore, because all the projections 910 are located in the light receiving opening 190o, the energy loss can be avoided. In other words, because the light converging module 140 converges the first color light 901, the light collection efficiency of the light tunnel 190 is effectively enhanced.

In addition, because the first lens set 160 converges the beam and thus change the travel direction of the beam, and the incident angle will be equal to the reflecting angle, after the first color light 901 enters the first half portion 160a of the first lens set 160, the color wheel 170 transforms a part of the first color light 901 to the second color light and reflects a part of the first color light 901, and the second color light and the reflected first color light 901 then pass the second half portion 160b of the first lens set 160 and become the parallel beam. Therefore, after the first color light 901 passes the diffuser 150, the first color light 901 only needs to pass the reflector 132, the first lens set 160, the color wheel 170, and second lens set 180 to reach the light tunnel 190, such that the number of the optical components in the optical path system is significantly reduced and thus the volume of the laser light source 100 is effectively reduced.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, 6th paragraph. In particular, the use of "step of" in the claims herein is not intended to invoke the provisions of 35 U.S.C. § 112, 6th paragraph.

What is claimed is:

1. A laser light source for a projector, comprising:
    a laser light source module configured to emit a first color light;
    a light converging module, wherein the first color light has a travel direction when the first color light passes the light converging module, the travel direction is a first direction, the light converging module is configured to converge the first color light along a second direction perpendicular to the first direction and not to converge the first color light along a third direction perpendicular to the first direction and the second direction, and the light converging module is configured to make the first color light become a parallel beam after the first color light passes the light converging module;
    a first lens set having a first half portion and a second half portion, wherein the first half portion is configured to receive the first color light emitted by the light converging module and make the first color light become a converging beam after the first color light passes the first half portion;
    a color wheel configured to receive the first color light emitted by the first half portion, transform a part of the first color light to a second color light, and reflect a part of the first color light, wherein an incident angle the first color light incident on the color wheel is less than 90°, the second color light and the reflected first color light enter the second half portion, and the second color light and the reflected first color light become parallel beams after the second color light and the reflected first color light pass the second half portion;
    a second lens set configured to receive the first color light and the second color light emitted by the second half portion and make the first color light and the second color light become converging beams after the first color light and the second color light pass the second lens set; and
    a light tunnel configured to collect the first color light and the second color light emitted by the second lens set.

2. The laser light source of claim 1, further comprising:
    a converging lens configured to receive the first color light emitted by the laser light source module and make the first color light become a converging beam after the first color light passes the converging lens; and
    a diverging lens configured to receive the first color light emitted by the converging lens and make the first color light become a parallel beam after the first color light passes the diverging lens.

3. The laser light source of claim 1, wherein the light converging module comprises:

a first lenticular lens configured to receive the first color light emitted by the laser light source module and make the first color light become a converging beam after the first color light passes the first lenticular lens; and a second lenticular lens configured to receive the first color light emitted by the first lenticular lens and make the first color light become a parallel beam after the first color light passes the second lenticular lens.

4. The laser light source of claim 1, wherein beam space distributions of the first color light before the first color light is incident on the color wheel and after the first color light is reflected by the color wheel does not overlap with each other.

5. The laser light source of claim 1, wherein the first color light and the second color light do not pass any other optical component after the first color light and the second color light exit the second half portion and before the first color light and the second color light enter the second lens set.

6. The laser light source of claim 1, further comprising:
a reflector configured to reflex the first color light after the first color light passes the light converging module and make the first color light enter the first lens set.

7. The laser light source of claim 6, wherein the first color light passes the reflector once in an overall optical path of the laser light source.

8. The laser light source of claim 6, wherein a beam space distribution of the first color light between the light converging module and the reflector partially overlaps a beam space distribution of the first color light between the first lens set and the second lens set.

9. The laser light source of claim 1, wherein the color wheel comprises:
a body;
a reflective layer disposed on the body; and
a fluorescent layer disposed on the reflective layer.

10. The laser light source of claim 1, further comprising a diffuser configured to receive the first color light emitted by the light converging module and make an energy distribution of the first color light become uniform after the first color light passes the diffuser.

* * * * *